United States Patent
Kim et al.

(10) Patent No.: US 12,456,183 B2
(45) Date of Patent: Oct. 28, 2025

(54) SYSTEM AND PLATFORM FOR AUTOMATIC OPTIMIZATION OF IMAGE QUALITY OF IMAGE SENSOR AND OPERATING METHOD THEREOF

(71) Applicant: SAMSUNG ELECTRONICS CO., LTD., Suwon-si (KR)

(72) Inventors: Young Hoon Kim, Suwon-si (KR); Kun Dong Kim, Suwon-si (KR); Sung Su Kim, Suwon-si (KR); Jin Hyun Kim, Suwon-si (KR); Da Gyeom Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 18/339,838

(22) Filed: Jun. 22, 2023

(65) Prior Publication Data

US 2024/0070835 A1 Feb. 29, 2024

(30) Foreign Application Priority Data

Aug. 23, 2022 (KR) .................. 10-2022-0105666

(51) Int. Cl.
*G06T 7/00* (2017.01)
*H04N 23/80* (2023.01)

(52) U.S. Cl.
CPC .......... *G06T 7/0002* (2013.01); *H04N 23/80* (2023.01); *G06T 2207/20081* (2013.01); *G06T 2207/30168* (2013.01)

(58) Field of Classification Search
CPC ......... G06T 7/0002; G06T 2207/20081; G06T 2207/30168; H04N 23/80
(Continued)

(56) References Cited

U.S. PATENT DOCUMENTS 9,734,567 B2 8/2017 Zhang et al.
9,741,098 B2 8/2017 Cox
(Continued)

OTHER PUBLICATIONS

Kim, Younghoon, et al. "Dnn-based isp parameter inference algorithm for automatic image quality optimization." Electronic Imaging 32 (2020): 1-6. (Year: 2020).*
(Continued)

*Primary Examiner* — Jonathan S Lee
(74) *Attorney, Agent, or Firm* — MORGAN, LEWIS & BOCKIUS LLP

(57) ABSTRACT

A system of automatic optimization of image quality of an image sensor includes an image learning data generation unit generating an image tuning knowledge database, which includes pairs of a plurality of sets of values of a plurality of parameters and a plurality of sets of image quality evaluation scores for a plurality of image quality evaluation items for evaluating a quality of each of a plurality of images generated by the image sensor, using an image tuning database sampling module, an image signal processor modeling unit generating a machine learning model, for each image, for automatically optimizing the quality of each image, and an image sensor image quality optimization unit automatically controlling values of some of the plurality of parameters based on a user's image quality selection and the machine learning model. The image quality evaluation scores are produced by a distributed camera simulation system including servers.

20 Claims, 19 Drawing Sheets

(58) Field of Classification Search
USPC .......................................................... 382/155
See application file for complete search history.

(56) References Cited

U.S. PATENT DOCUMENTS

| | | | |
|---|---|---|---|
| 9,916,525 B2 | 3/2018 | Mailhe et al. | |
| 10,607,326 B2 | 3/2020 | Medasani et al. | |
| 10,755,425 B2 | 8/2020 | Nishimura et al. | |
| 10,896,352 B2 | 1/2021 | Hsieh et al. | |
| 11,283,991 B2 | 3/2022 | Sharma et al. | |
| 2015/0341667 A1 | 11/2015 | Liao et al. | |
| 2017/0103512 A1* | 4/2017 | Mailhe | G06V 10/993 |
| 2019/0295240 A1* | 9/2019 | Doutre | G06V 40/172 |
| 2020/0211178 A1 | 7/2020 | Zhou et al. | |
| 2020/0372682 A1 | 11/2020 | Kim et al. | |
| 2021/0150660 A1* | 5/2021 | An | G06N 20/00 |
| 2022/0036536 A1 | 2/2022 | Baijal et al. | |
| 2022/0245792 A1* | 8/2022 | Gao | G06T 7/0008 |

OTHER PUBLICATIONS

Kim, Younghoon, et al. "Camera image quality tradeoff processing of image sensor re-mosaic using deep neural network." Electronic Imaging 33 (2021): 1-7. (Year: 2021).*

* cited by examiner

FIG. 7

| SAMPLE SETS | FIRST PARAMETER | SECOND PARAMETER | THIRD PARAMETER | FOURTH PARAMETER | FIFTH PARAMETER | SIXTH PARAMETER |
|---|---|---|---|---|---|---|
| FIRST SAMPLE SET | 0.044228663 | 0.038579834 | 0.033179612 | 0.00315716 | 5.032357315 | 0.002490043 |
| SECOND SAMPLE SET | 0.499957577 | 0.395238308 | 0.175435334 | 0.001974256 | 6.185582175 | 0.001551618 |
| THIRD SAMPLE SET | 0.737152587 | 0.359916707 | 0.271189239 | 0.004134573 | 4.866400578 | 0.003652816 |
| FOURTH SAMPLE SET | 0.1178515525 | 0.070321963 | 0.023926504 | 0.00330025 | 3.504815075 | 0.005864024 |
| FIFTH SAMPLE SET | 0.023597637 | 0.022546022 | 0.011841482 | 0.003107577 | 4.782453976 | 0.001036556 |
| SIXTH SAMPLE SET | 0.164110612 | 0.142397376 | 0.075145674 | 0.000532902 | 5.762873075 | 0.00371333 |

FIRST SAMPLE IMAGE • SECOND SAMPLE IMAGE • THIRD SAMPLE IMAGE • FOURTH SAMPLE IMAGE • FIFTH SAMPLE IMAGE • SIXTH SAMPLE IMAGE

SYSTEM AND PLATFORM FOR AUTOMATIC OPTIMIZATION OF IMAGE QUALITY OF IMAGE SENSOR AND OPERATING METHOD THEREOF

CROSS-REFERENCE TO RELATED APPLICATION

This application claims priority under 35 U.S.C. § 119 to Korean Patent Application No. 10-2022-0105666, filed on Aug. 23, 2022 in the Korean Intellectual Property Office, the disclosure of which is incorporated by reference herein in its entirety.

TECHNICAL FIELD

Embodiments of the present disclosure relate to a system and platform for the automatic optimization of the image quality of an image sensor, and operating methods thereof.

DISCUSSION OF RELATED ART

An image sensor is a type of semiconductor device that converts optical information into electrical signals. Examples of an image sensor include a charge coupled device (CCD) image sensor and a complementary metal-oxide semiconductor (CMOS) image sensor. A raw image output from the image sensor may be processed by an image signal processor (ISP). The ISP may generate an image from the raw image based on various parameters, and the quality and characteristics of the generated image may be modified in various manners in accordance with the values of the parameters applied to the ISP.

SUMMARY

Aspects of the present disclosure provide a system of automatic optimization of the image quality of an image sensor based on a user's image quality selection (e.g., preference) and the modeling of an image signal processor (ISP).

Aspects of the present disclosure also provide a method of automatic optimization of the image quality of an image sensor based on a user's image quality selection (e.g., preference) and the modeling of an ISP.

Aspects of the present disclosure also provide a platform for the automatic optimization of the image quality of an image sensor based on a user's image quality selection (e.g., preference) and the modeling of an ISP.

According to an embodiment of the present disclosure, a system of automatic optimization of an image quality of an image sensor includes an image learning data generation unit, an image signal processor modeling unit, and an image sensor image quality optimization unit. The image learning data generation unit generates an image tuning knowledge database, which includes pairs of a plurality of sets of values of a plurality of parameters and a plurality of sets of image quality evaluation scores for a plurality of image quality evaluation items for evaluating a quality of each of a plurality of images generated by the image sensor, using an image tuning database sampling module. The image signal processor modeling unit generates a machine learning model, for each image sensor, for automatically optimizing the quality of each image. The image sensor image quality optimization unit automatically controls values of one or more of the plurality of parameters based on a user's image quality selection and the machine learning model. The plurality of image quality evaluation scores is produced by a distributed camera simulation system, which includes a plurality of servers.

According to an embodiment of the present disclosure, a method of automatic optimization of an image quality of an image sensor includes generating, by an image learning data generation unit, an image tuning knowledge database, which includes pairs of a plurality of sets of values of a plurality of parameters and a plurality of sets of image quality evaluation scores for a plurality of image quality evaluation items for evaluating a quality of each of a plurality of images generated by the image sensor. The method further includes generating, by an image signal processor modeling unit, a machine learning model, for each image sensor, for automatically optimizing the quality of each image. The method further includes optimizing, by an image sensor image quality optimization unit, the image quality of the image sensor by automatically controlling values of one or more of the plurality of parameters based on a user's image quality selection and the machine learning model. The method further includes verifying, by a distributed camera simulation system, a result of optimizing the image quality of the image sensor. The image tuning knowledge database is generated by specifying a range of values of each of associated parameters that affect producing a high image quality evaluation score, and randomly sampling parameter values from the specified range of parameter values.

According to an embodiment of the present disclosure, a platform for automatic optimization of an image quality of an image sensor includes a distributed camera simulation system, an image learning data generation unit, an image signal processor modeling unit, an image sensor image quality optimization unit, a database storage, and a user server. The distributed camera simulation system receives a raw image, which is obtained by capturing an image of a subject using the image sensor, and a plurality of parameter values, and outputs a plurality of image quality evaluation scores for a plurality of image quality evaluation items for evaluating the quality of each of a plurality of images generated by the image sensor. The image learning data generation unit generates an image tuning knowledge database, which includes pairs of a plurality of sets of values of a plurality of parameters and the plurality of sets of image quality evaluation scores. The image signal processor modeling unit generates a machine learning model, for each image sensor, for automatically optimizing the quality of each image. The image sensor image quality optimization unit generates an image tuning configuration by automatically controlling values of one or more of the plurality of parameters based on a user's image quality selection and the machine learning model. The database storage stores a raw image database, which includes a set of raw images. The user server is provided via the Internet or an application server. The distributed camera simulation system includes a plurality of servers, each of the which includes an image signal processor simulator and an image quality evaluation automatic labeling module. The machine learning model is implemented as an artificial neural network having values of the plurality of parameters as an input layer and the plurality of image quality evaluation scores as an output layer.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail embodiments thereof with reference to the accompanying drawings, in which:

FIG. 7 is referred to for describing sample values, sample sets, and sample images for the parameters applicable to an ISP, according to some embodiments of the present disclosure;

DETAILED DESCRIPTION

Figure 1:
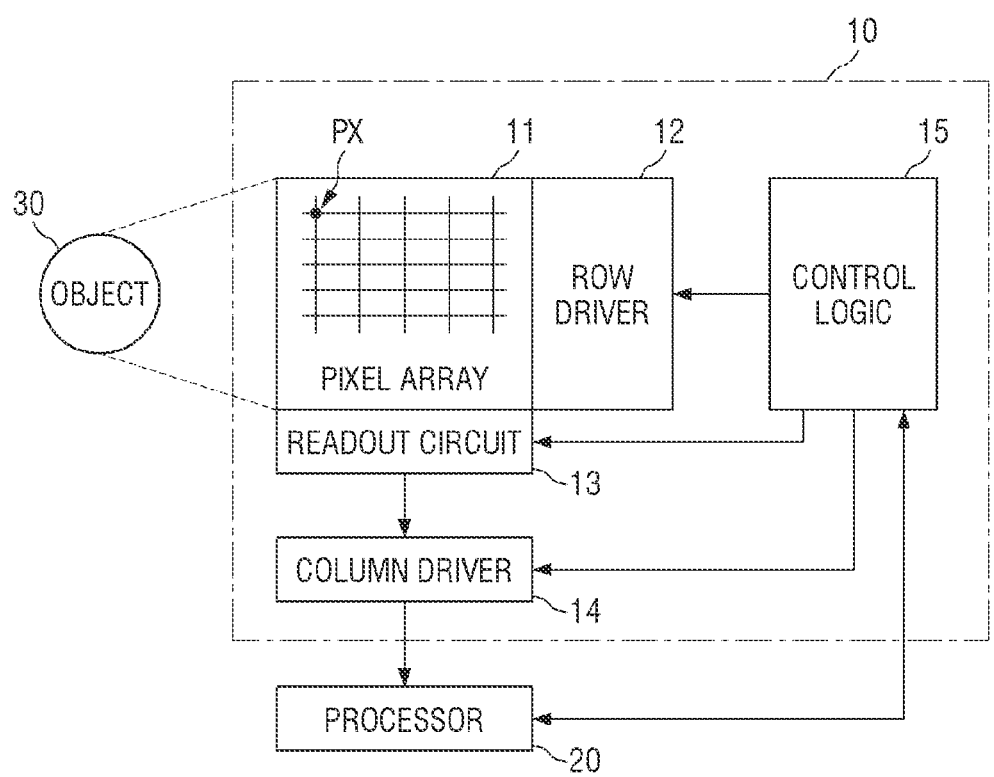
FIG. 1 is a block diagram of an image sensor according to some embodiments of the present disclosure.

Embodiments of the present disclosure will be described with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a block diagram of an image sensor according to some embodiments of the present disclosure.

Referring to FIG. 1, an image sensor 10 may include a pixel array 11, a row driver 12, a readout circuit 13, a column driver 14, and a control logic 15. The row driver 12, the readout circuit 13, the column driver 14, and the control logic 15, which are circuits that generate image data that controls the pixel array 11, may be included in a controller.

The image sensor 10 may generate row data (or a raw image) by converting light from an object 30 into electrical signals. The raw image may be output to a processor 20. The processor 20 may include an image signal processor (ISP), which generates an image based on the raw image. The ISP may be mounted in the image sensor 10. The ISP may also be implemented as an ISP simulator simulated on the Internet.

The pixel array 11, which is included in the image sensor 10, may include a plurality of pixels PX. The pixels PX may include photoelectric devices capable of generating electric charges by receiving light, such as, for example, photodiodes (PDs). Each of the pixels PX may include two or more photoelectric devices that generate pixel signals corresponding to multiple wavelength bands or that provide an autofocus function.

Each of the pixels PX may include a pixel circuit that generates a pixel signal based on the electric charges generated by PDs. The pixel circuit may include, for example, a transfer transistor, a driving transistor, a selection transistor, and a reset transistor. For example, the pixel circuit may output a reset voltage and a pixel voltage based on the electric charges generated by the PDs. The pixel voltage may be a voltage in which the electric charges generated by the PDs are reflected. Two or more adjacent pixels PX may form one pixel group and may share at least some of the transfer transistor, the driving transistor, the selection transistor, and the reset transistor with one another.

The row driver 12 may drive the pixel array 11 in units of rows. For example, the row driver 12 may generate a transfer control signal that controls the transfer transistors of the pixel circuits of the pixels PX, a reset control signal that controls the reset transistors of the pixel circuits of the pixels PX, and a selection control signal that controls the selection transistors of the pixel circuits of the pixels PX.

The readout circuit 13 may include a correlated double sampler (CDS) and an analog-to-digital converter (ADC). The CDS may be connected, via column lines, to pixels PX included in a row line selected by a row selection signal from the row driver 12, and may detect a reset voltage and a pixel voltage by performing correlated double sampling. The ADC may convert the reset voltage and the pixel voltage, detected by the CDS, into digital signals, and may output the digital signals.

The column driver 14 may include, for example, a latch circuit, a buffer, and an amplification circuit, may temporarily store or amplify digital signals from the readout circuit 13, and may thus generate image data. The operation timings of the row driver 12, the readout circuit 13, and the column driver 14 may be determined by the control logic 15, and the control logic 15 may operate in response to a control command from the processor 20. The processor 20 may generate an image by performing signal processing on a raw image output from the column driver 14 or the control logic 15, and may output the generated image to a display device or store the generated image in a storage device such as a memory.

Figure 2:
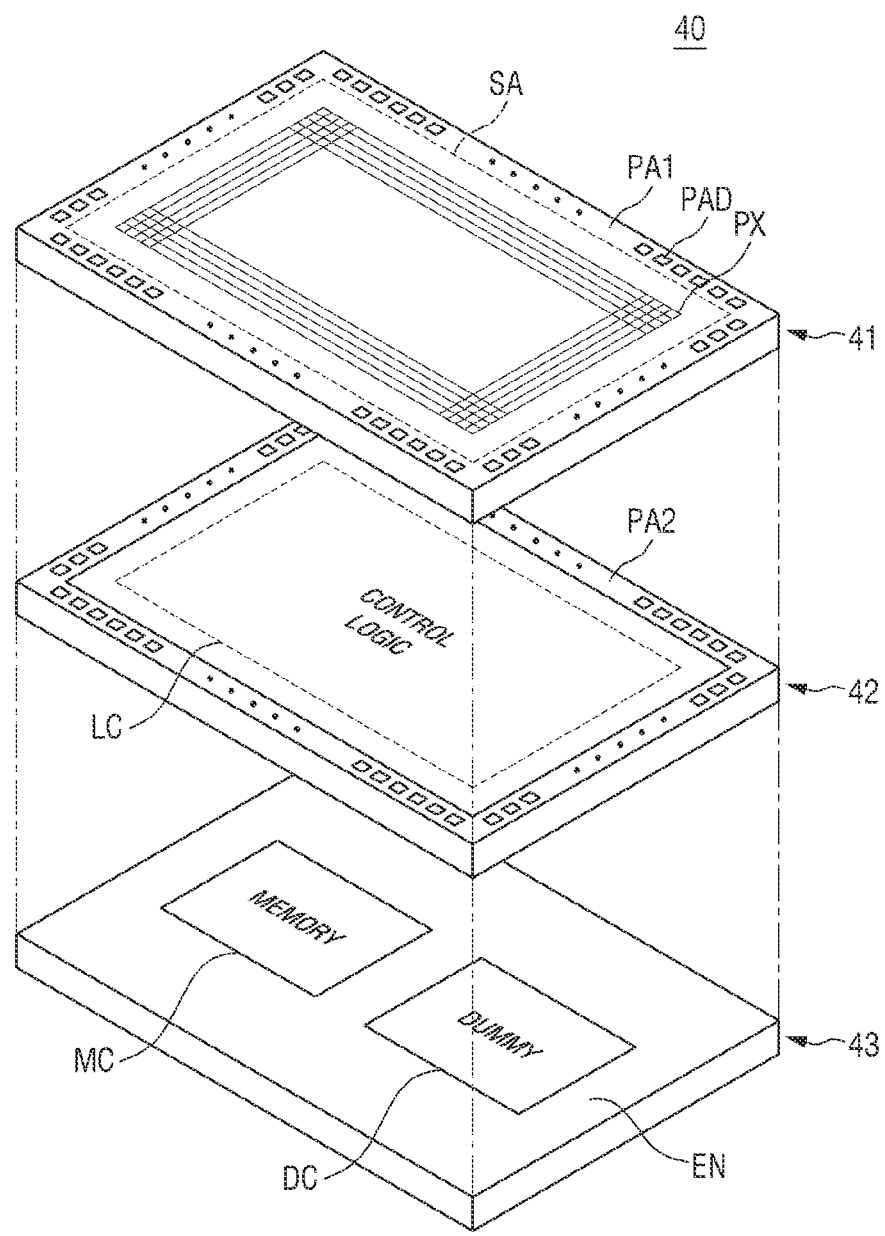
FIGS. 2 and 3 illustrate image sensors according to some embodiments of the present disclosure.
Figure 3:
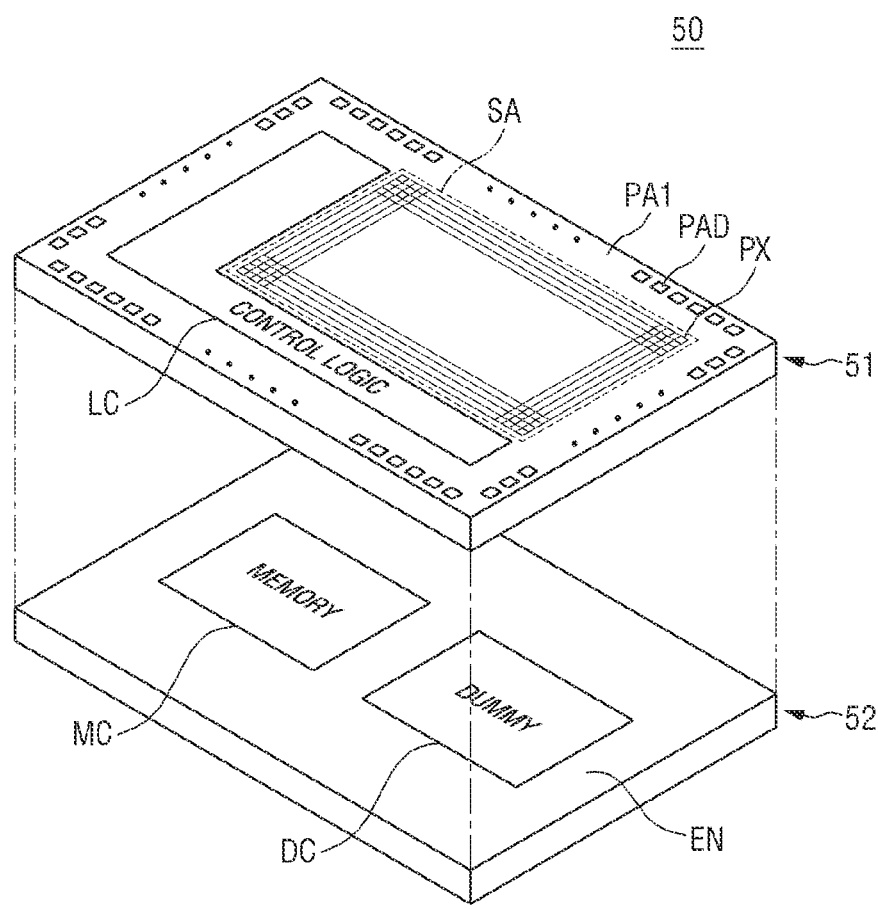

FIGS. 2 and 3 illustrate image sensors according to some embodiments of the present disclosure.

Image sensors 40 and 50 of FIGS. 2 and 3 may correspond to the image sensor 10 of FIG. 1.

Referring to FIG. 2, the image sensor 40 may include a first layer 41, a second layer 42 disposed below the first layer 41, and a third layer 43 disposed below the second layer 42. The first, second, and third layers 41, 42, and 43 may be vertically stacked. In some embodiments, the first and second layers 41 and 42 may be stacked on a wafer level, and the third layer 43 may be attached to the bottom of the second layer 42 on a chip level. The first, second, and third layers 41, 42, and 43 may be provided as a single semiconductor package.

The first layer 41 may include a sensing area SA, in which a plurality of pixels PX are provided, and a first pad area PA1, which is provided around the sensing area SA. The first pad area PA1 may include a plurality of upper pads PAD, and the upper pads PAD may be connected, through vias, to pads in a second pad area PA2 of the second layer 42 and a logic circuit LC of the second layer 42.

Each of the pixels PX may include a PD, which generates electric charges by receiving light, and a pixel circuit, which processes the electric charges generated by the PD. The pixel circuit may include a plurality of transistors, which may output a voltage corresponding to the electric charges generated by the PD.

The second layer 42 may include a plurality of devices, which provide the logic circuit LC. The devices included in the logic circuit LC may provide circuits that drive pixel circuits provided in the first layer 41, such as, for example, the row driver 12, the readout circuit 13, the column driver 14, and the control logic 15 of FIG. 1. The devices included in the logic circuit LC may be connected to the pixel circuits of the pixels PX through the first and second pad areas PA1 and PA2. The logic circuit LC may acquire reset voltages and pixel voltages from the pixels PX, and may thus generate pixel signals.

In some embodiments, at least one of the pixels PX may include multiple PDs. Pixel signals generated from the electric charges of the multiple PDs may have different phases, and the logic circuit LC may provide an autofocus function based on the phase difference between the pixel signals from the multiple PDs.

The third layer 43, which is provided below the second layer 42, may include, for example, a memory chip MC, a dummy chip DC, and a protective layer EN, which seals the memory chip MC and the dummy chip DC. The memory chip MC may be, for example, a dynamic random-access memory (DRAM) or a static random-access memory (SRAM), and the dummy chip DC may be a chip that does not actually have the function of storing data. The memory chip MC may be electrically connected to at least some of the devices included in the logic circuit LC of the second layer 42 through bumps, and may store information used to provide an autofocus function. In some embodiments, the bumps may be micro-bumps.

Referring to FIG. 3, the image sensor 50 may include first and second layers 51 and 52. The first layer 51 may include a sensing area SA, in which a plurality of pixels PX are provided, a logic circuit LC, in which devices that drive the pixels PX are provided, and a first pad area PA1, which is provided around the sensing area SA and the logic circuit LC. The first pad area PA1 may include a plurality of upper pads PAD, and the upper pads PAD may be connected to a memory chip MC of the second layer 52 through vias. The second layer 52 may include the memory chip MC, the dummy chip DC, and the protective layer EN, which seals the memory chip MC and the dummy chip DC.

Figure 4:
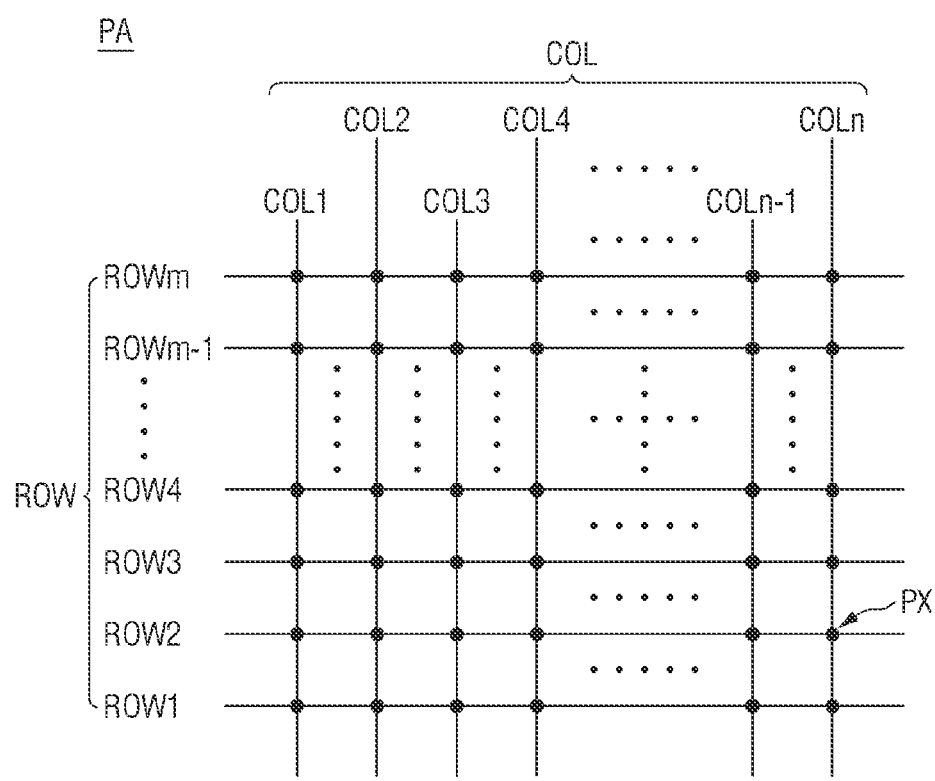
FIG. 4 illustrates a pixel array of an image sensor according to some embodiments of the present disclosure.

FIG. 4 illustrates a pixel array of an image sensor according to some embodiments of the present disclosure.

Referring to FIG. 4, a pixel array PA of an image sensor may include a plurality of pixels PX. The pixels PX may be connected to a plurality of row lines ROW, e.g., first through m-th ROW1 through ROWm, and a plurality of column lines COL, e.g., first through n-th column lines COL1 through COLn, where each of m and n is a positive integer. The image sensor may drive the pixels PX in units of the row lines ROW. For example, the image sensor may drive a row line selected from among the row lines ROW, and the amount of time that it takes to read out reset voltages and pixel voltages from pixels PX connected to the selected row line may be defined as a horizontal period. The image sensor may drive the pixels PX in a rolling shutter mode where the pixels PX are sequentially exposed to light, or in a global shutter mode where the pixels PX are exposed to light at the same time.

Reset voltages and pixel voltages output from the pixels PX may be converted into digital data and may be processed into a raw image through signal processing. A processor, which is mounted in the image sensor or communicates with the image sensor, may generate a result image to be displayed via a display or to be stored in a memory, based on the raw image. Different result images may be generated from the same raw image depending on the performance and a tuning method of an ISP. Thus, an optimal result image can be provided by increasing the performance of an ISP or accurately tuning an ISP.

The tuning of an ISP may generally be performed by a method that relies on human evaluation, and thus, may not be objective and accurate. In some embodiments, the performance of an ISP can be increased by providing a system for the automatic optimization of the image quality of an image sensor using a method of modeling an ISP that precludes the intervention of human judgement. Also, an optimal result image can be provided by tuning an ISP in consideration of a user's image quality selection (e.g., in consideration of a user's preference regarding the resulting image quality).

Figure 5:
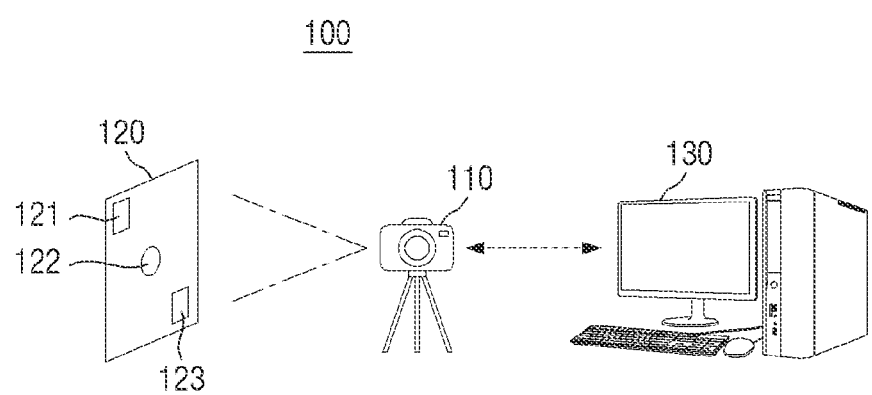
FIG. 5 illustrates a system that provides a method for the automatic optimization of the image quality of an image sensor according to some embodiments of the present disclosure.

FIG. 5 illustrates a system that provides a method for the automatic optimization of the image quality of an image sensor according to some embodiments of the present disclosure.

Referring to FIG. 5, a system 100 that provides a method for the automatic optimization of the image quality of an image sensor may include an electronic device 110, which includes an image sensor 10 (see FIG. 1), and a computing device 130, in which a machine learning model for automatically optimizing the image quality of image generated by the image sensor is run. Here, for each image sensor, one machine learning model can correspond to one image sensor.

The electronic device 110 is illustrated as being a camera, but embodiments are not limited thereto, and the electronic device 110 may be replaced with other devices including, for example, an image sensor. Also, the computing device 130 is illustrated as being a desktop computer, but embodiments are not limited thereto, and the computing device 130 may be replaced with other devices capable of running a machine learning model. In some embodiments, the electronic device 110 and the computing device 130 may be implemented as a single device.

In some embodiments, examples of a subject image 120 include a chart image including different geometric figures and a natural scene such as an image of, for example, people, buildings, or the natural landscape. The subject image 120 may include a plurality of first, second, and third image-capture areas 121, 122, and 123, and the first, second, and third image-capture areas 121, 122, and 123 may differ from one another. For example, the first image-capture area 121 may be an area where people are displayed, the second image-capture area 122 may be an area where a black-and-white pattern is displayed, and the third image-capture area 123 may be an area where a color pattern is displayed.

A sample image obtained by capturing an image of a subject via the electronic device 110 may be a raw image. The raw image may be transmitted to the computing device 130, which includes an ISP simulator.

For each image sensor, the computing device 130 may generate a machine learning model corresponding to that image sensor by modeling an ISP for that image sensor. For example, the computing device 130 may generate a machine learning model for image generated by the image sensor 10 by modeling an ISP for the image sensor 10. Thereafter, if a user of the image sensor 10 inputs his or her image quality selection (e.g., preference) to the computing device 130, the computing device 130 may tune the image sensor 10 to the user's image quality selection (e.g., preference) by using a machine learning model for the image sensor 10. Also, the computing device 130 may provide the results of the tuning to the user as a predicted image quality evaluation score and a result image.

Figure 6:
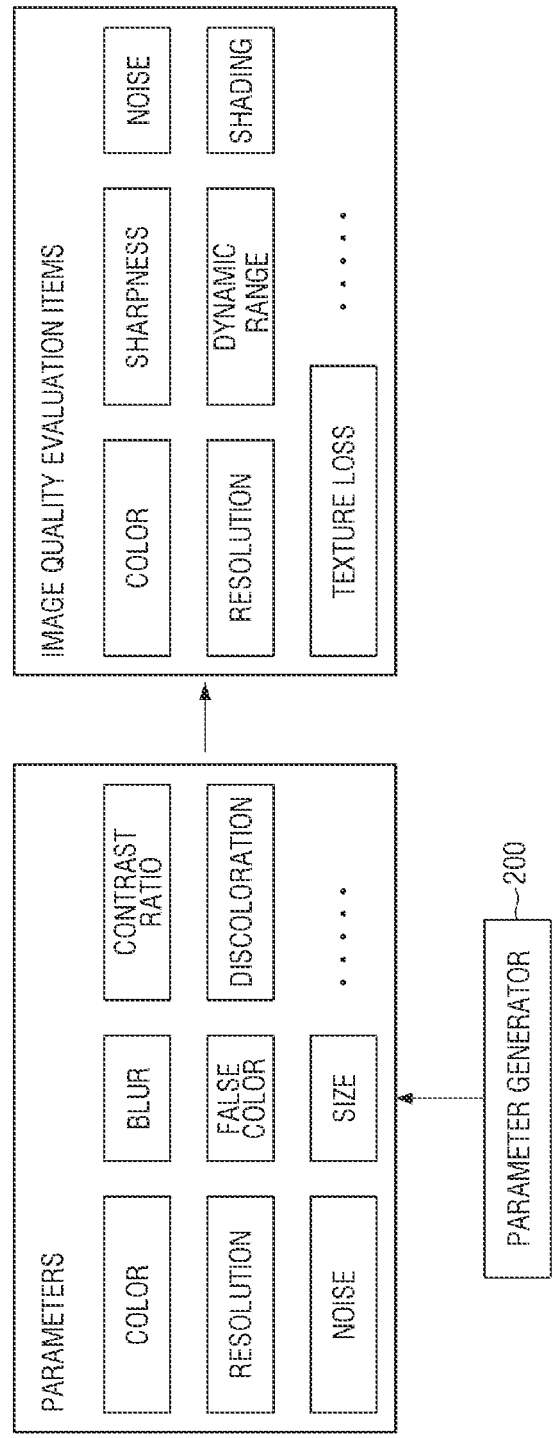
FIG. 6 is referred to for describing the types of parameters applicable to an image signal processor (ISP) and image quality evaluation items, according to some embodiments of the present disclosure.

FIG. 6 is referred to for describing the types of parameters applicable to an ISP and image quality evaluation items, according to some embodiments of the present disclosure.

Referring to FIG. 6, the parameters are elements used to tune the quality of an image generated from a raw image by an ISP. The characteristics of an image generated by an ISP may vary depending on how the parameters are set. A parameter generator 200 may generate parameters to be applied to an ISP and may determine the values of the parameters.

The parameters may include, for example, color, blur, contrast ratio, resolution, false color, discoloration, noise, and size. However, embodiments of the present disclosure are not limited thereto. That is, various other parameters may also be applicable to the ISP according to embodiments of the present disclosure.

The image quality evaluation items are items used to evaluate the quality of an image generated by an ISP. The quality evaluation items may include, for example, color, sharpness, noise, resolution, dynamic range, shading, and texture loss. However, embodiments of the present disclosure are not limited thereto. That is, various other image quality evaluation items may also be used according to embodiments of the present disclosure. Image quality evaluation scores for the image quality evaluation items may vary depending on how the parameters are set.

FIG. 7 is referred to for describing sample values, sample sets, and sample images for the parameters applicable to an ISP, according to some embodiments of the present disclosure.

Referring to FIG. 7, the sample values of first through sixth parameters, generated by the parameter generator 200 of FIG. 6, may form a sample set. Each sample set may be applied to an ISP together with a raw image, thereby generating a sample image. FIG. 7 shows only six parameters, six sample sets, and six sample images, but embodiments of the present disclosure are not limited thereto. That is, the number of parameters for forming each sample set, the number of sample sets, and the number of sample images may vary, and the values of the first through sixth parameters may also vary, according to embodiments of the present disclosure.

Figure 8:
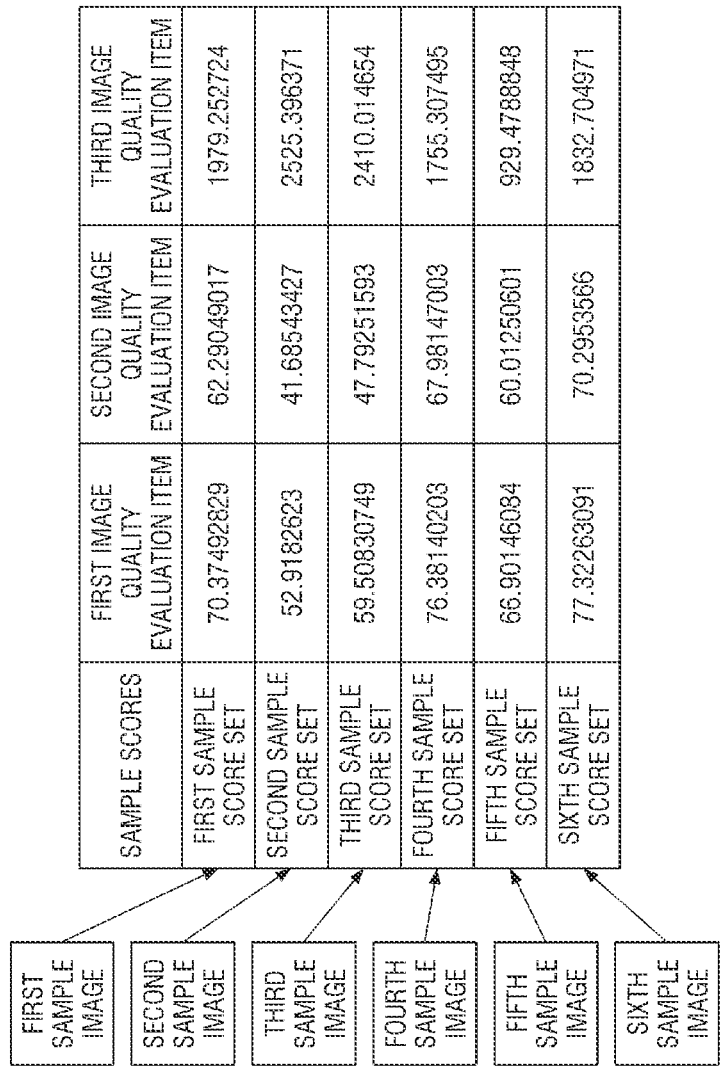
FIG. 8 is referred to for describing image quality evaluation scores according to some embodiments of the present disclosure.

FIG. 8 is referred to for describing image quality evaluation scores according to some embodiments of the present disclosure.

Referring to FIG. 8, each sample image may be scored for each image quality evaluation item, thereby obtaining image quality evaluation scores. Image quality evaluation scores of each sample image may form a sample score set.

For example, a first sample image may be scored for each of first through third image quality evaluation items, and image quality evaluation scores of the first sample image for the first through third image quality evaluation items may form a first sample score set. FIG. 8 illustrates only three image quality evaluation items for each sample image, but the number of image quality evaluation items for each sample image may vary.

The sample values of a plurality of parameters (e.g., a sample set), a sample image corresponding to the sample set, and a sample score set of the sample image may form a pair together. As the values of the parameters vary randomly, pairs of sample sets, sample images, and sample score sets may be generated, thereby generating an image tuning knowledge database.

Figure 9:
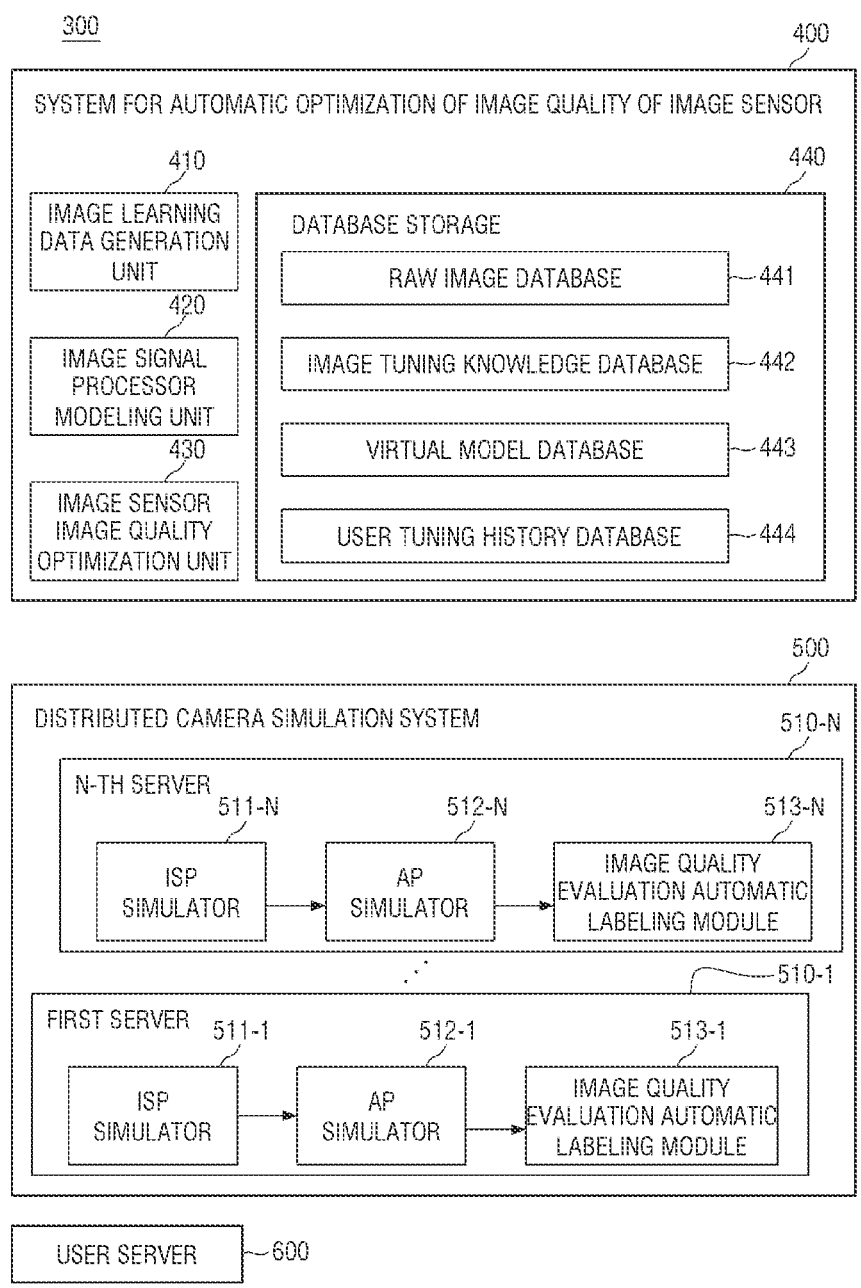
FIG. 9 is a block diagram of a platform for the automatic optimization of the image quality of an image sensor according to some embodiments of the present disclosure.

FIG. 9 is a block diagram of a platform for the automatic optimization of the image quality of an image sensor according to some embodiments of the present disclosure.

Referring to FIG. 9, a platform 300 (hereinafter, the automatic optimization platform 300) for the automatic optimization of the image quality of an image sensor may include a system 400 (hereinafter, the automatic optimization system 400) for the automatic optimization of the image quality of an image sensor, a distributed camera simulation system 500, and a user server 600. In some embodiments, the automatic optimization system 400 and the distributed camera simulation system 500 may be implemented in the computing device 130 of FIG. 5. Also, in some embodiments, the user server 600 may be interacting with the platform 300 via the Internet or via an application server.

The automatic optimization system 400 may include an image learning data generation unit 410, an image signal processor modeling unit 420, an image sensor image quality optimization unit 430, and a database storage 440.

The image learning data generation unit 410 may generate image learning data used to model an ISP for image generated by the image sensor 10. In some embodiments, the image learning data may correspond to the image tuning knowledge database described above with reference to FIG. 8. It will be described below with reference to FIGS. 10 through 13 how the image learning data generation unit 410 creates an image tuning knowledge database.

The image signal processor modeling unit 420 may generate a machine learning model that automatically tunes the quality of an image in accordance with the user's image quality selection (e.g., preference) by referencing an image tuning knowledge database for image generated by the image sensor 10. It will be described below with reference to FIGS. 14 and 15 how the image signal processor modeling unit 420 generates a machine learning model for image generated by the image sensor 10.

The image sensor image quality optimization unit 430 may automatically control the values of one or more parameters, associated with the user's image quality selection (e.g., preference) evaluation item, based on a machine learning model for a given ISP in accordance with the user's image quality selection (e.g., preference), and may generate an image tuning configuration. It will be described below with reference to FIGS. 16 and 17 how the image sensor image quality optimization unit 430 performs image quality optimization based on a machine learning model and generates an image tuning configuration.

The database storage 440 may include a raw image database 441, an image tuning knowledge database 442, a virtual model database 443 (for image generated by the image sensor 10), and a user tuning history database 444.

The raw image database 441 may include a set of raw images, and the raw images may be provided to ISP simulators 511-1 to 511-N. The image tuning knowledge database 442 may be stored in the database storage 440.

The virtual model database 443 may include a set of machine learning models for each image sensor (for example, image sensor 10), generated by the image signal processor modeling unit 420. The machine learning models stored in the virtual model database 443 may be transmitted to the image sensor image quality optimization unit 430 when the user performs image quality optimization on a given image sensor.

The user tuning history database 444 may include sets of imaging tuning configurations, which are the results of previous image quality tuning processes, predicted image quality evaluation scores, and result images obtained by the previous image quality tuning processes. Data stored in the user tuning history database 444 may be used as they are or may be set as initial values for the additional processing of any desired image quality evaluation item.

The distributed camera simulation system 500 may include first through N-th servers 510-1 through 510-N (where N is an integer of 2 or greater). The first through N-th servers 510-1 through 510-N each may include the ISP simulators 511-1 through 511-N, AP simulators 512-1 through 512-N, and image quality evaluation automatic labeling modules 513-1 through 513-N, respectively. The AP simulators 512-1 through 512-N, which are implemented on the Internet to make an ISP operable on the Internet, may generate images based on a raw image received from the raw image database 441 and the values of a plurality of parameters. The quality and the characteristics of the generated images may vary depending on how the plurality of parameters are set.

The AP simulator 512-1 through 512-N may generate simulation images (e.g., BMP or JPG images) that can be observed with the human eyes, by performing simulation on images received from each of the ISP simulators 511-1 through 511-N. Then, the image quality evaluation automatic labeling modules 513-1 through 513-N may measure and label the image quality evaluation scores of the images, received from the AP simulator 512-1 through 512-N, for a plurality of image quality evaluation items. As a result, the sets of values of the parameters applied to the ISP simulators 511-1 through 511-N may be paired one-to-one with the sets of image quality evaluation scores finally obtained by the image quality evaluation automatic labeling modules 513-1 through 513-N.

As the distributed camera simulation system 500 includes a plurality of servers, multiple pairs of parameter value sets and image quality evaluation score sets can be generated at the same time. Thus, an image tuning knowledge database with a large amount of image tuning information or knowledge can be established within a short period of time.

Figure 10:
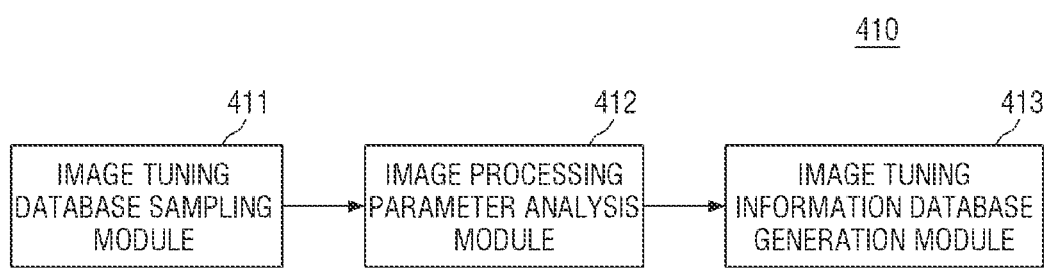
FIG. 10 is a block diagram of an image learning data generation unit according to some embodiments of the present disclosure.

FIG. 10 is a block diagram of an image learning data generation unit according to some embodiments of the present disclosure.

Referring to FIG. 10, the image learning data generation unit 410 may include an image tuning database sampling module 411, an image processing parameter analysis module 412, and an image tuning knowledge database generation module 413.

Figure 11:
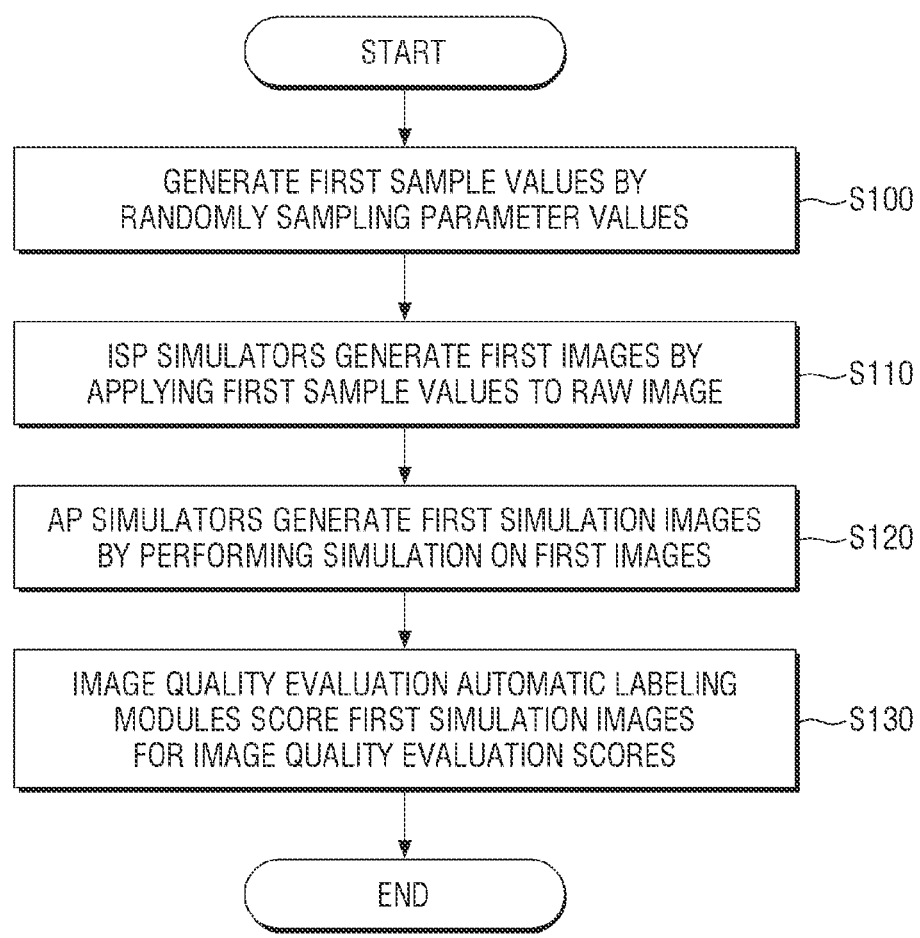
FIG. 11 is a flowchart illustrating an operation of the image tuning database sampling module according to some embodiments of the present disclosure.

FIG. 11 is a flowchart illustrating an operation of the image tuning database sampling module according to some embodiments of the present disclosure.

Figure 12:
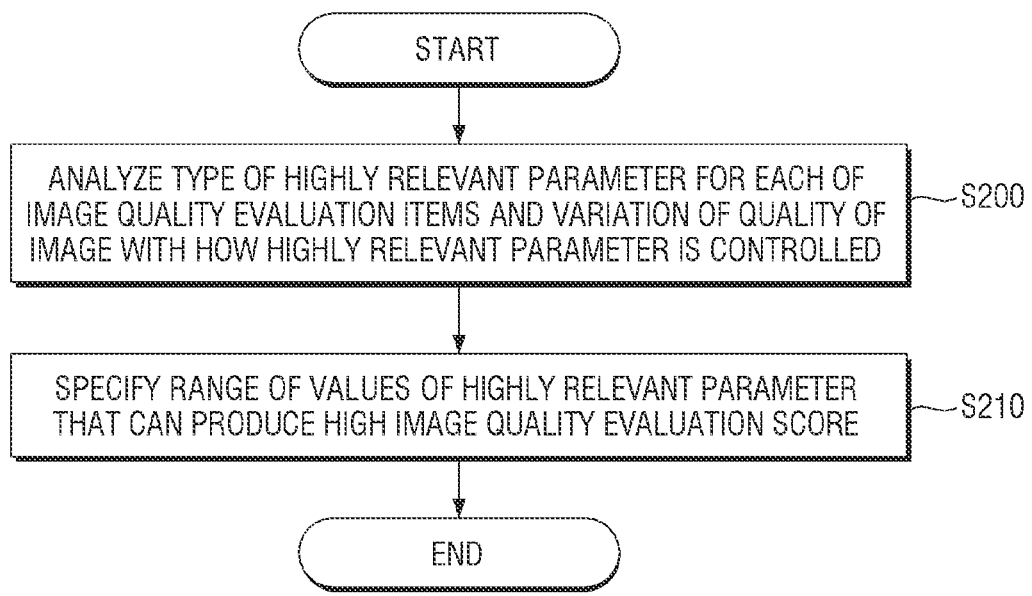
FIG. 12 is a flowchart illustrating an operation of an image processing parameter analysis module according to some embodiments of the present disclosure.

FIG. 12 is a flowchart illustrating an operation of an image processing parameter analysis module according to some embodiments of the present disclosure.

Figure 13:
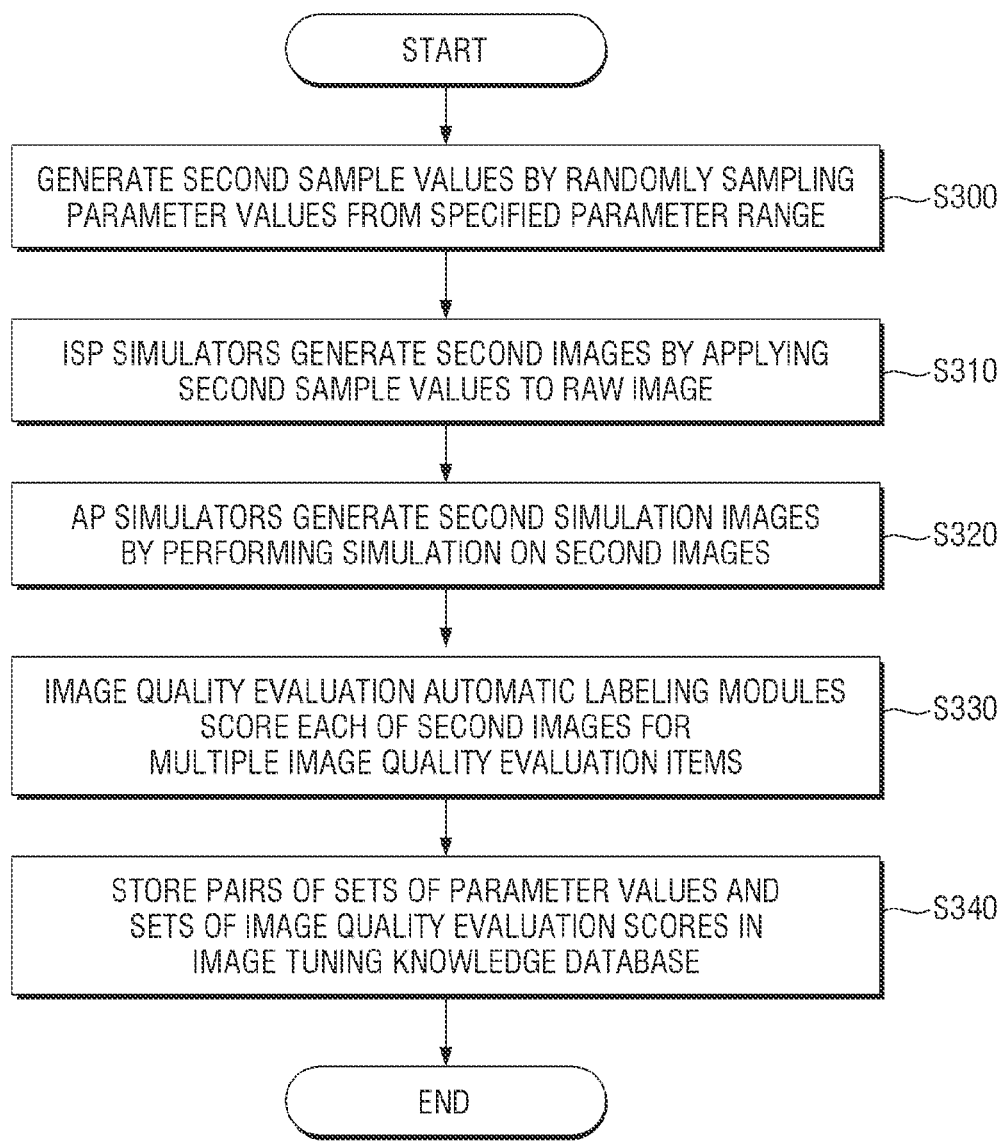
FIG. 13 is a flowchart illustrating an operation of an image tuning knowledge database generation module according to some embodiments of the present disclosure.

FIG. 13 is a flowchart illustrating an operation of an image tuning knowledge database generation module according to some embodiments of the present disclosure.

It will hereinafter be described with reference to FIGS. 9 through 13 how the image learning data generation unit 410 generates the image tuning knowledge database 442.

Referring to FIGS. 9 through 11, the image tuning database sampling module 411 may generate a plurality of first sample values (S100) by randomly sampling the values of a plurality of parameters by arbitrarily raising or lowering the values of the parameters within a predetermined range. The first sample values may correspond to one of the first through sixth sample sets of FIG. 7.

The ISP simulators 511-1 through 511-N may generate a plurality of first images (S110) by applying the first sample values, received from the image tuning database sampling module 413, to a raw image, received from the raw image database 441. Thereafter, the AP simulator 512 may generate a plurality of first simulation images (S120) by performing simulation on the first images received from the ISP simulators 511-1 through 511-N. Thereafter, the image quality evaluation automatic labeling modules 513 may receive the first simulation images from the AP simulator 512 and may measure the image quality evaluation scores of each of the first simulation images for a plurality of image quality evaluation items (S130).

Thereafter, referring to FIGS. 9, 10, and 12, the image processing parameter analysis module 412 may analyze which of the parameters is highly relevant to each of the image quality evaluation items, e.g., which of the parameters is a highly relevant parameter for each of the image quality evaluation items, based on the first sample values, received from the image tuning database sampling module 411, and the image quality evaluation scores of the first simulation images, and may analyze how the quality of an image changes in accordance with the value of the highly relevant parameter for each of the image quality evaluation items (S200). A highly relevant parameter is a parameter that has a large impact on image quality compared to other less relevant parameters. As a result, the image processing parameter analysis module 412 may specify the range of values of the highly relevant parameter that can significantly affect producing a high image quality evaluation score for each of the image quality evaluation items (S210).

Thereafter, referring to FIGS. 9, 10, and 13, the image tuning knowledge database generation module 413 may generate a plurality of second sample values (S300) by randomly sampling a parameter value from the range of values of the highly relevant parameter for each of the image quality evaluation items that can produce a high image quality evaluation score.

The ISP simulators 511-1 through 511-N may generate a plurality of second images (S310) by applying the second sample values, received from the image tuning knowledge database generation module 413, to the received raw image. Thereafter, the AP simulator 512 may generate a plurality of second simulation images (S320) by performing simulation on the second images received from the ISP simulators 511-1 through 511-N. Thereafter, the image quality evaluation automatic labeling modules 513 may receive the second simulation images from the AP simulator 512 and may measure the image quality evaluation scores of each of the second simulation images for the image quality evaluation items (S330). As a result, pairs of a plurality of sets of parameter values and a plurality of sets of image quality evaluation scores may be generated and may be stored in the image tuning knowledge database 442 (S340).

In this manner, an image tuning knowledge database can be created by randomly sampling parameter values from ranges of parameter values that can produce high image quality evaluation scores for the image quality evaluation items, while excluding ranges of parameter values that produce low image quality evaluation scores for the image quality evaluation items. Accordingly, an image tuning knowledge database for generating a machine learning model for image generated by the image sensor 10 can be effectively created.

Figure 14:
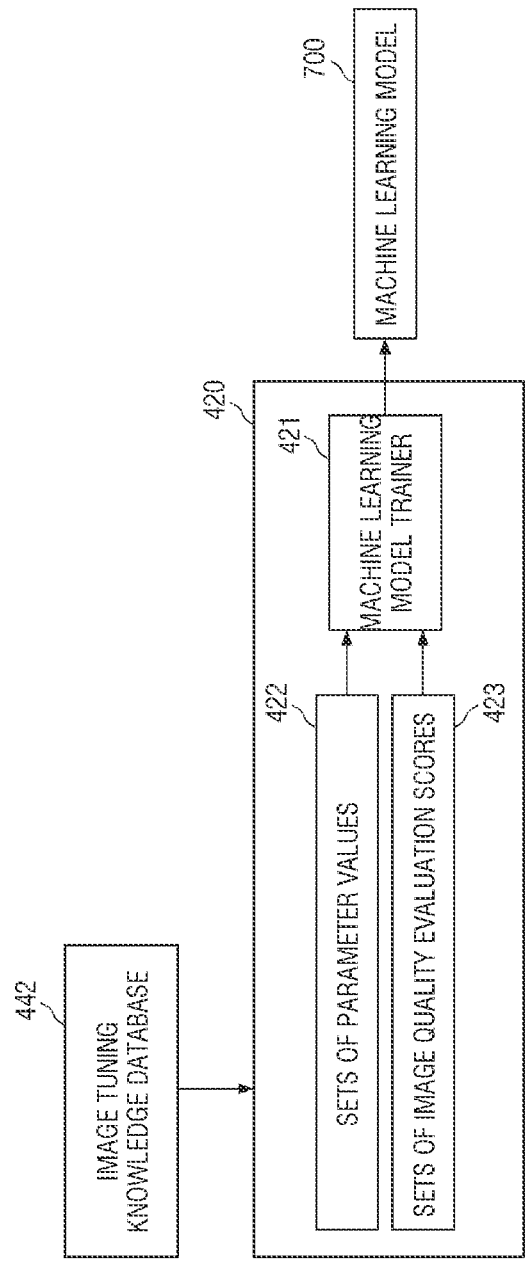
FIG. 14 is a block diagram of an ISP modeling unit according to some embodiments of the present disclosure.

FIG. 14 is a block diagram of an ISP modeling unit according to some embodiments of the present disclosure.

Referring to FIG. 14, the ISP modeling unit 420 may operate in conjunction with the image tuning knowledge database 442. The image tuning knowledge database 442 may be obtained by the method described above with reference to FIGS. 10 through 13 and may store a plurality of parameter value sets 422 and a plurality of image quality evaluation scores sets 423 each set corresponding to a set of the plurality of the parameter values.

A machine learning model trainer 421 may read out the plurality of the parameter value sets 422 and the plurality of the image quality evaluation scores sets 423 from the image tuning knowledge database 442 and may learn a machine learning model 700.

Figure 15:
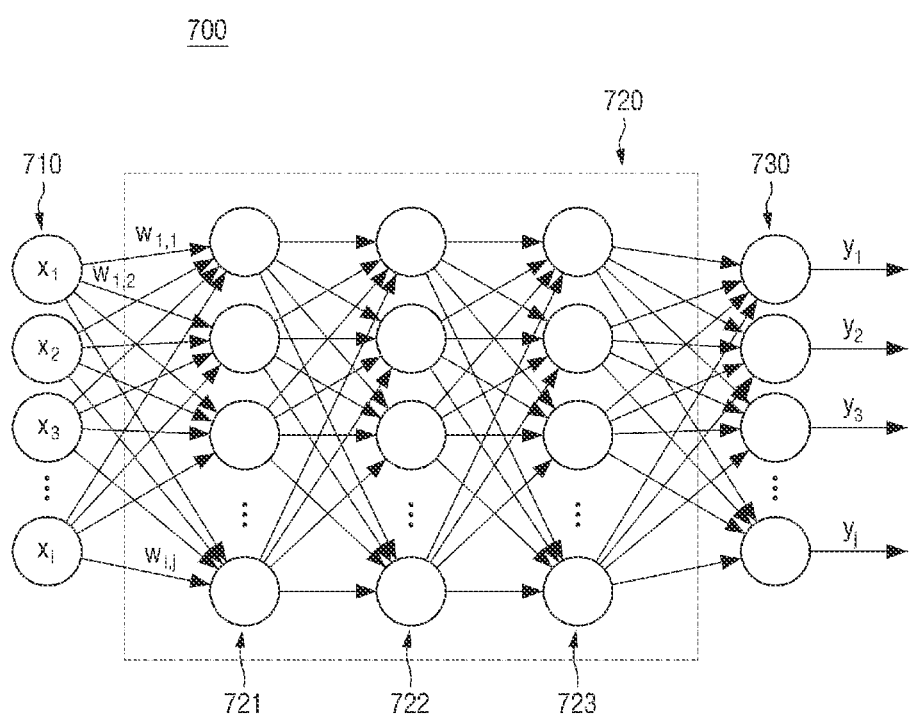
FIG. 15 illustrates a machine learning model that can be employed in the modeling of an ISP, according to some embodiments of the present disclosure.

FIG. 15 illustrates a machine learning model that can be employed in the modeling of an ISP, according to some embodiments of the present disclosure.

Referring to FIG. 15, the machine learning model 700 may be implemented as an artificial neural network (ANN). The machine learning model 700 may include an input layer 710, hidden layers 720, and an output layer 730. In some embodiments, a plurality of nodes included in the input layer 710, a plurality of nodes included in each of the hidden layers 720, and a plurality of nodes included in the output layer 730 may be fully connected to one another. The input layer 710 may include a plurality of input nodes ($x_1$ through $x_i$), where i is a positive integer, and the number of input nodes of the input layer 710 may correspond to the number of parameters. The output layer 730 may include a plurality of output nodes ($y_1$ through $y_j$), and the number of output nodes of the output layer 730 may correspond to the number of image quality evaluation items.

The hidden layers 720 may include first through third hidden layers 721 through 723. The number of hidden layers 720 may vary. For example, the machine learning model 700 may be learned by controlling the weights of hidden nodes included in each of the hidden layers 721 through 723. For example, a set of a plurality of parameter values (e.g., one of the first through sixth sample sets of FIG. 7) may be input to the input layer 710, and the weights of the hidden nodes included in each of the hidden layers 720 may be controlled until the output layer 730 outputs a set of a plurality of particular image quality evaluation scores (e.g., one of the first through sixth sample score sets of FIG. 8). Once the learning of the machine learning model 700 is complete, the image quality score of a result image output by an ISP can be predicted for the input set of parameter values by using the machine learning model 700.

The machine learning model 700 for image generated by the image sensor 10 may be stored in the virtual model database 443 for each image sensor, in the database storage 440 of FIG. 9, and may be provided to the image sensor image quality optimization unit 430 of FIG. 9 when the image sensor image quality optimization unit 430 performs image quality optimization.

Figure 16:
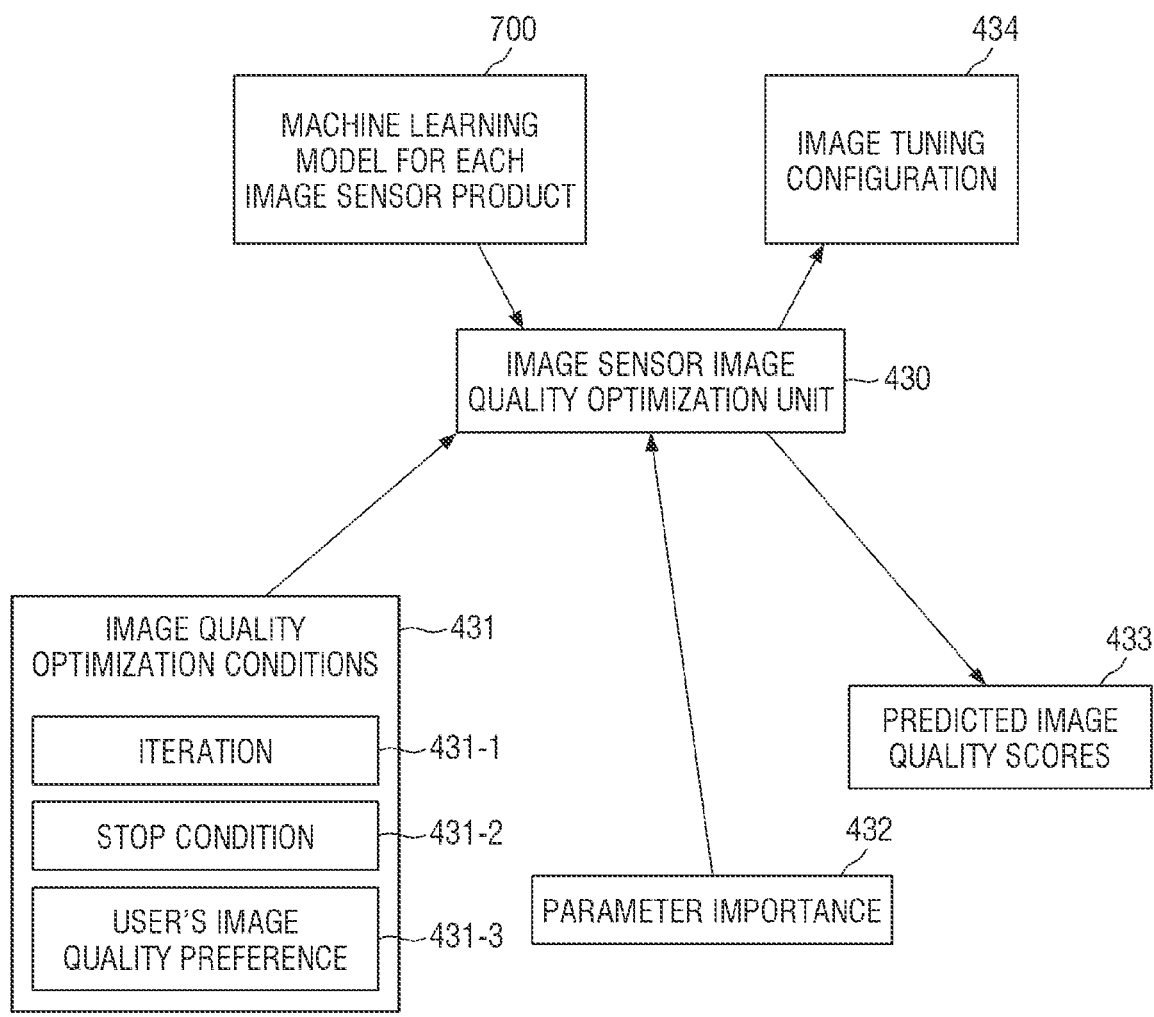
FIG. 16 is a block diagram of an image sensor image quality optimization unit according to some embodiments of the present disclosure.

FIG. 16 is a block diagram of an image sensor image quality optimization unit according to some embodiments of the present disclosure.

Referring to FIG. 16, the image sensor image quality optimization unit 430 may generate an image tuning configuration 434 and predicted image quality scores 433 by performing image quality optimization on an image captured by the image sensor 10 of FIG. 1, based on the machine learning model 700 for image generated by the image sensor 10, image quality optimization conditions 431, and parameter importance 432.

The image quality optimization conditions 431 may include iteration 431-1, a stop condition 431-2, and the user's image quality selection (e.g., preference) 431-3. The iteration 431-1 refers to the period of performing image quality optimization on an image via the machine learning model 700 of FIG. 14. The image sensor image quality optimization unit 430 may determine how many times to adjust the values of the parameters based on the iteration 431-1, set by the user.

The stop condition 431-2 may be a condition for determining whether the image sensor image quality optimization unit 430 should continue or stop an image quality optimization process. The user's image quality selection (e.g., preference) 431-3 may be determined based on which of the image quality evaluation items of FIG. 6 are selected by the user. For example, the user may determine priorities among the image quality evaluation items and may input a target image quality evaluation score.

The parameter importance 432 may correspond to the result of analysis (as performed by the image processing parameter analysis module 412 of FIG. 10) of the variation of the quality of an image with the type of highly relevant parameter and how the value of the highly relevant parameter is controlled. The image tuning configuration 434 may correspond to numerical data output from the output layer 730 of the machine learning model 700 as a result of image tuning performed by the image sensor image quality optimization unit 430.

Figure 17:
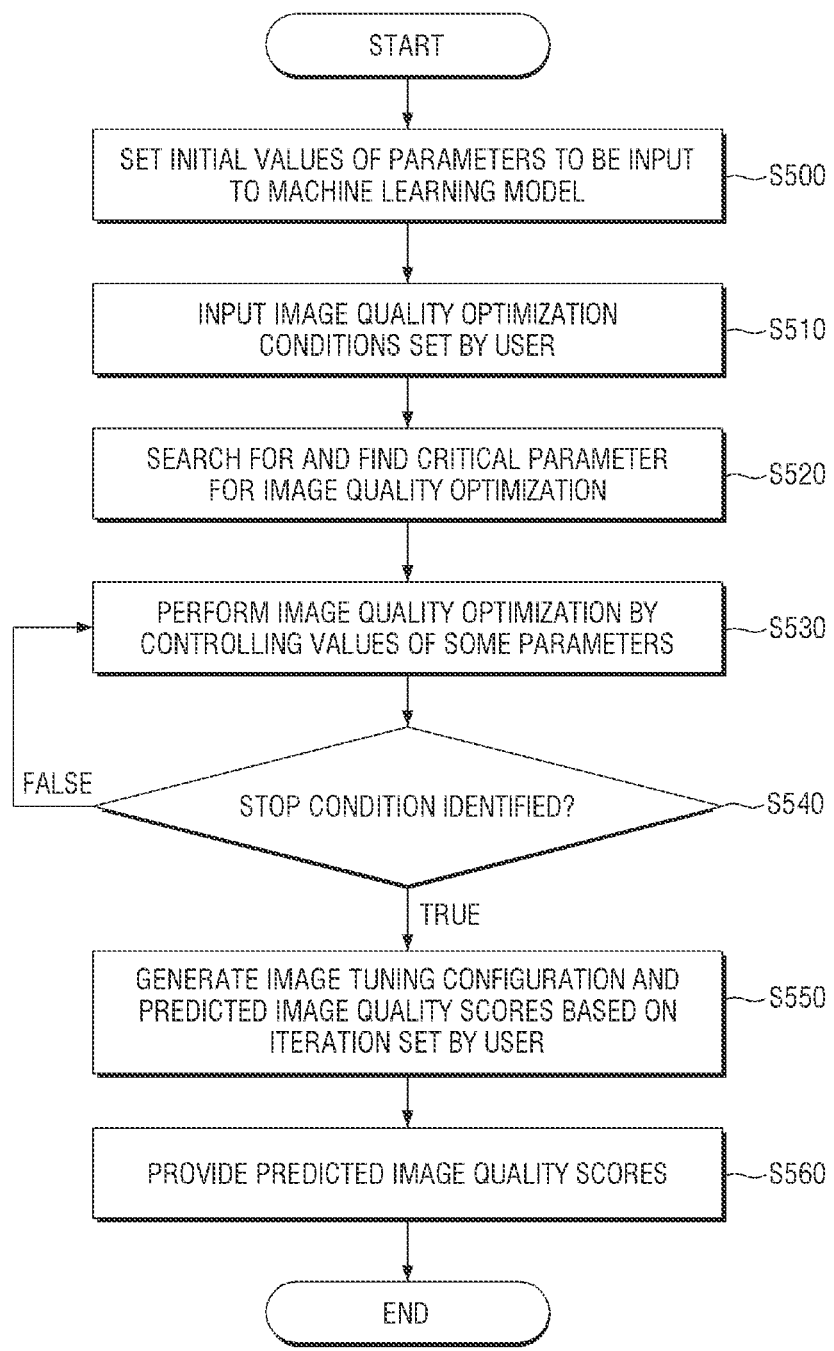
FIG. 17 is a flowchart illustrating an image sensor image quality optimization operation of the image sensor image quality optimization unit, according to some embodiments of the present disclosure.

FIG. 17 is a flowchart illustrating an image sensor image quality optimization operation of the image sensor image quality optimization unit, according to some embodiments of the present disclosure.

Referring to FIGS. 9, 10, 16 and 17, the image sensor image quality optimization unit 430 may set the initial values of a plurality of parameters input to the machine learning model 700 (S500). In some embodiments, previous image quality tuning data stored in the user tuning history database 444 may be set as the initial values of the parameters. For example, if the user wishes to use the previous image quality tuning data, the previous image quality tuning data stored in the user tuning history database 444 may be set as the initial values of the parameters. If the user wishes to perform additional image quality improvement based on the previous image quality tuning data, the previous image quality tuning data stored in the user tuning history database 444 may be set as the initial values of the parameters, and then, the user may additionally input image quality optimization conditions.

Thereafter, image quality optimization conditions set by the user may be input to the image sensor image quality optimization unit 430 (S510). For example, the iteration, the stop condition, and the image quality selection (e.g., preference) set by the user may be input to the image sensor image quality optimization unit 430.

Thereafter, the image sensor image quality optimization unit 430 may search for and find a highly relevant parameter for image quality optimization (S520) based on the machine learning model 700 for image generated by the image sensor 10 and the image quality optimization conditions set by the user. The image sensor image quality optimization unit 430 may search for and find a highly relevant parameter associated with the user's selected (e.g., preferred) image quality evaluation item, among a plurality of image quality evaluation items, based on the result of analysis performed by the image processing parameter analysis module 412.

Thereafter, the image sensor image quality optimization unit 430 may perform image quality optimization (S530) by automatically controlling the values of one or more of the parameters in accordance with the image quality optimization conditions set by the user, with the use of the machine learning model 700. The image sensor image quality optimization unit 430 may perform a detailed image quality optimization by selectively controlling the value of the highly relevant parameter associated with the user's selected image quality evaluation item, without affecting the other image quality evaluation items. In some embodiments, for the detailed image quality optimization, the image sensor image quality optimization unit 430 may provide the user in advance with data such as, for example, the correlations between the parameters and the image quality evaluation items and the priorities among the image quality evaluation items.

Thereafter, the image sensor image quality optimization unit 430 may identify the stop condition when the iteration set by the user has elapsed once (S540). Then, if the stop condition is true (S540-T), the image sensor image quality optimization unit 430 may generate an image tuning configuration based on the iteration set by the user and may generate a predicted image quality score (S550).

If the stop condition is false (S540-F), the image sensor image quality optimization unit 430 may continue to perform image quality optimization until the stop condition is true. Finally, the image sensor image quality optimization unit 430 may provide the predicted image quality score to the user (S560).

Figure 18:
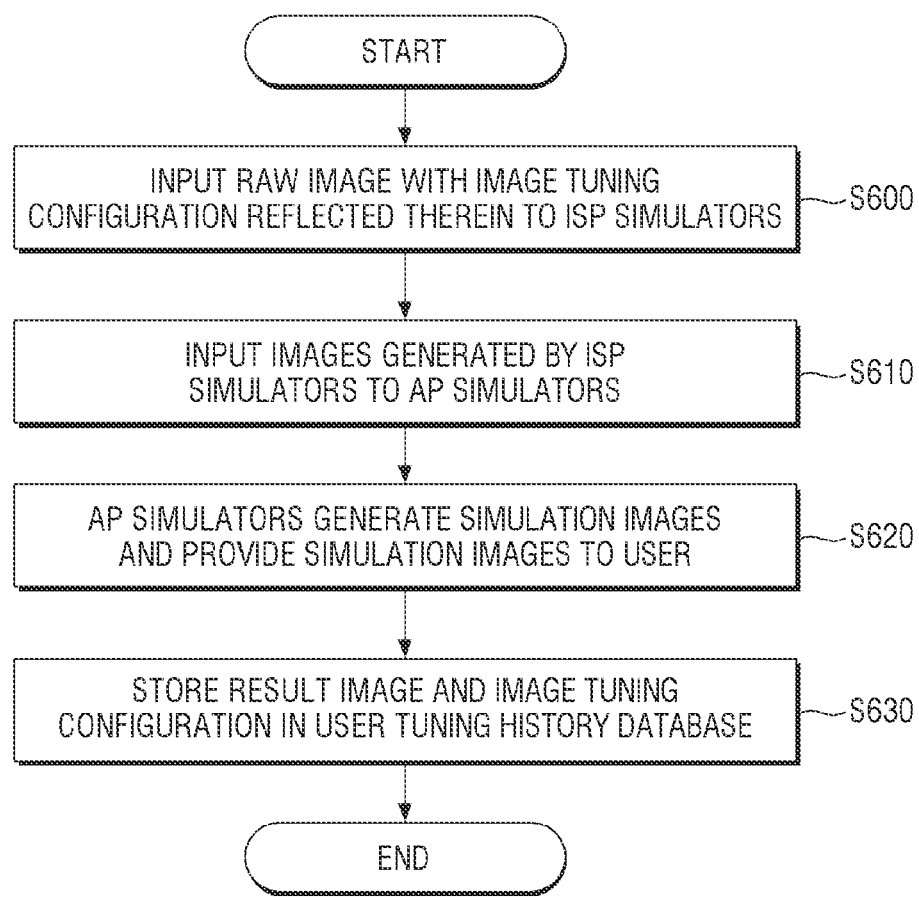
FIG. 18 is a flowchart illustrating a method of verifying the result of the image sensor image quality optimization operation, according to some embodiments of the present disclosure.

FIG. 18 is a flowchart illustrating a method of verifying the result of the image sensor image quality optimization operation, according to some embodiments of the present disclosure.

Referring to FIGS. 9, 16, and 18, the image tuning configuration generated by the image sensor image quality optimization unit 430 may be reflected in the raw image received from the raw image database 441 and may then be input to the ISP simulators 511-1 through 511-N (S600). Thereafter, the images generated by the ISP simulators 511-1 through 511-N may be input to the AP simulator 512 (S610).

The AP simulator 512 may generate simulation images that can be observed with the naked eyes of the user, by performing simulation on the images input thereto from the ISP simulators 511-1 through 511-N, and may provide the simulation images to the user (S620). The simulation images may be final result images obtained by performing image quality optimization based on the image captured by the image sensor 10, the image quality optimization conditions set by the user, and the machine learning model 700.

Thereafter, the simulation images, e.g., the final result images and the image tuning configuration generated by the image sensor image quality optimization unit 430, may be stored in the user tuning history database 444 in the database storage 440 (S630).

As described above, according to embodiments, the user can be provided with an image whose quality has been tuned in accordance with the set of image quality optimization conditions set by the user as an image that can be observed with the naked eyes, and can compare a quality-optimized image with an image yet to be quality-optimized. Also, as the quality-optimized image or a result image and an image tuning configuration corresponding to the result image are stored in the user tuning history database 444, this information can be used again later or as initial data for another image quality optimization process.

Figure 19:
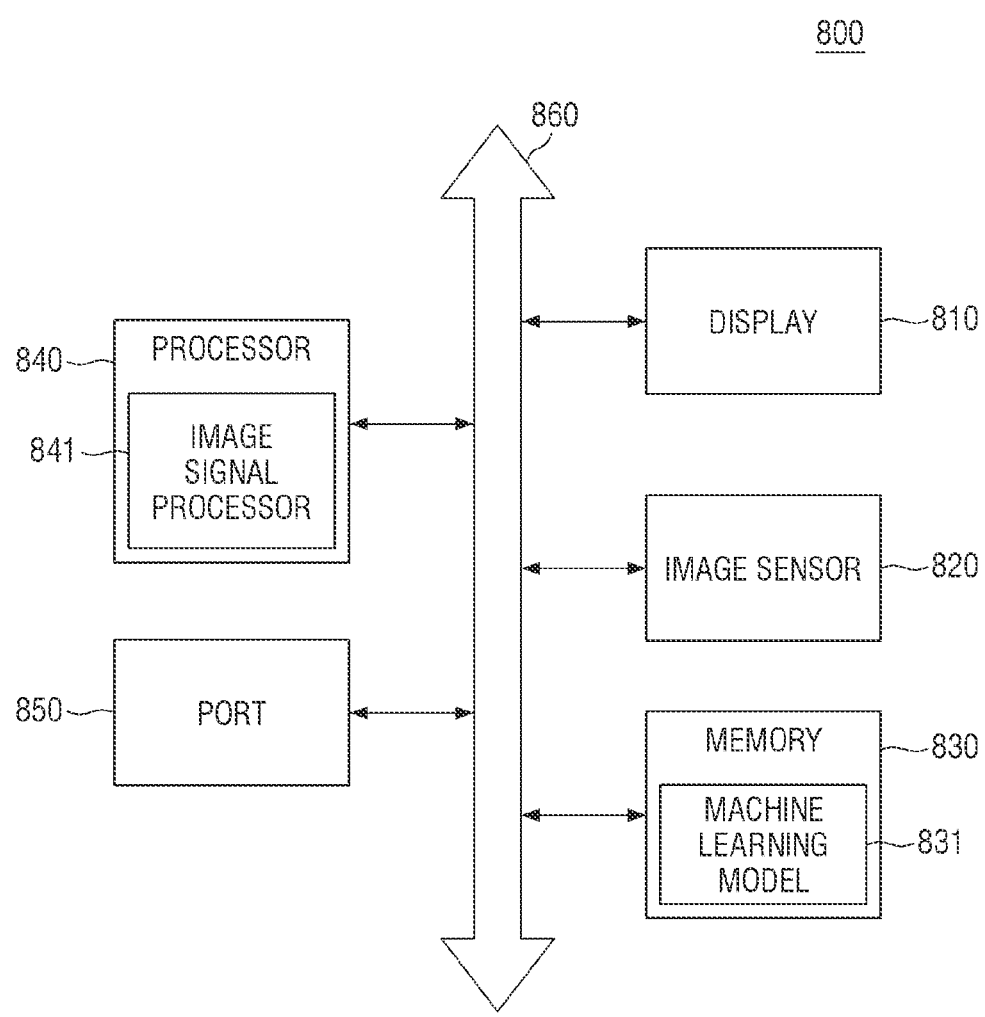
FIG. 19 is a block diagram of an electronic device in which a system for the automatic optimization of the image quality of an image sensor according to some embodiments of the present disclosure is implemented.

FIG. 19 is a block diagram of an electronic device in which a system for the automatic optimization of the image quality of an image sensor according to some embodiments of the present disclosure is implemented.

Referring to FIG. 19, an electronic device 800 may include, for example, a display 810, an image sensor 820, a memory 830, a processor 840, and a port 850. The electronic device 800 may further include, for example, a wired/wireless communication device, a power supply device, and the like. The image sensor 820 may correspond to the image sensor 10 of FIG. 1, and the processor 840 may correspond to the processor 20 of FIG. 1.

The port 850 may be provided for the electronic device 800 to communicate with, for example, a video card, a sound card, a memory card, a universal serial bus (USB) device, or the like. The electronic device 800 may encompass nearly all types of devices that can employ the image sensor 820, such as, for example, a smartphone, a tablet personal computer (PC), a digital camera, and the like.

The processor 840 may perform, for example, a particular operation, an instruction, a task, or the like. The processor 840 may be, for example, a central processing unit (CPU), a microprocessor unit (MCU), or a system-on-chip (SoC) and may communicate not only with the display 810, the image sensor 820, and the memory 830, but also other devices connected to the port 850, via a bus 860. The processor 840 may correspond to the processor 20 of FIG. 1.

The processor 840 may include an ISP 841. The ISP 841 may generate a result image using a raw image obtained by capturing an image of a subject via the image sensor 820.

The processor 840 may display the result image generated by the ISP 841 on the display 810, and may store the result image in the memory 830. In some embodiments, the ISP 841 may be implemented as the ISP simulator 511 of FIG. 9.

The memory 830 may be a storage medium for storing data utilized for the operation of the electronic device 800 or storing multimedia data. The memory 830 may include, for example, a volatile memory such as random-access memory (RAM) or a non-volatile memory such as a flash memory. Also, the memory 830 may include at least one of, for example, a solid-state drive (SSD), a hard disk drive (HDD), and an optical drive (ODD) as a storage device.

The memory 830 may include a machine learning model 831. The machine learning model 831 may receive parameters that determine the operation of the ISP 841, and may output image quality evaluation scores, generated by the ISP 841, of the result image for image quality evaluation items for evaluating the image quality of the result image. The machine learning model 831 may correspond to the machine learning model 700 of FIG. 14.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A system of automatic optimization of an image quality of an image sensor, comprising:
   an image learning data generation unit that generates an image tuning knowledge database, which includes pairs of a plurality of sets of values of a plurality of parameters and a plurality of sets of image quality evaluation scores for a plurality of image quality evaluation items for evaluating a quality of each of a plurality of images generated by the image sensor, using an image tuning database sampling module;
   an image signal processor modeling unit that generates a machine learning model, for each image sensor, for automatically optimizing the quality of each image; and
   an image sensor image quality optimization unit that automatically controls values of one or more of the plurality of parameters based on a user's image quality selection and the machine learning model,
   wherein the plurality of image quality evaluation scores is produced by a distributed camera simulation system, which includes a plurality of servers.

2. The system of claim 1, wherein
   each of the plurality of servers of the distributed camera simulation system includes an image signal processor simulator and an image quality evaluation automatic labeling module,
   the image signal processor simulator receives values of the plurality of parameters and a raw image, which is obtained by capturing an image of a subject using the image sensor, and
   the image quality evaluation automatic labeling module outputs a plurality of image quality evaluation scores corresponding to the values of the plurality of parameters, received by the image signal processor simulator.

3. The system of claim 2, wherein the image of the subject includes a chart image including different geometric figures and a natural scene.

4. The system of claim 1, wherein the plurality of parameters include at least two of color, blur, contrast ratio, resolution, false color, discoloration, noise, and size.

5. The system of claim 1, wherein the plurality of image quality evaluation items include at least two of color, sharpness, noise, resolution, dynamic range, shading, and texture loss.

6. The system of claim 1, wherein
   the image tuning database sampling module generates a plurality of first sample values by randomly sampling values of the plurality of parameters, and
   the distributed camera simulation system generates a plurality of first images and scores the first images.

7. The system of claim 6, wherein
   the image learning data generation unit further includes an image processing parameter analysis module, and
   the image processing parameter analysis module analyzes one or more parameters associated with each of the plurality of image quality evaluation items and a variation of the quality of an image with how the associated parameters are controlled and specifies a range of values of each of the associated parameters that can affect producing a high image quality evaluation score, based on correlations between values of a plurality of parameters and a plurality of image quality evaluation scores generated by the image tuning database sampling module and the distributed camera simulation system.

8. The system of claim 7, wherein
   the image learning data generation unit further includes an image tuning knowledge database generation module,
   the image tuning knowledge database generation module generates a plurality of second sample values by randomly sampling parameter values from the range of parameter values specified by the image processing parameter analysis module, and
   the distributed camera simulation system generates a plurality of second images and scores the second images.

9. The system of claim 7, wherein the image sensor image quality optimization unit generates an image tuning configuration by controlling values of one or more parameters associated with an image quality evaluation item selected by the user, from among the plurality of image quality evaluation items based on an importance of parameters for each of the plurality of image quality evaluation items analyzed by the image processing parameter analysis module.

10. The system of claim 1, wherein the values of the plurality of parameters are fully connected with the plurality of image quality evaluation scores.

11. The system of claim 1, wherein the image sensor image quality optimization unit determines a period of controlling values of the plurality of parameters for the optimization of the image quality of the image sensor, based on an iteration set by the user, and determines whether to continue to control the values of the plurality of parameters, based on a stop condition set by the user.

12. The system of claim 1, further comprising:
a database storage,
wherein the database storage stores a raw image database, which stores a set of raw images, the image tuning knowledge database, a virtual model database for each image sensor, which includes a set of machine learning models for each image sensor, and a user tuning history database, which includes image quality tuning results provided by the image sensor image quality optimization unit.

13. A method of automatic optimization of an image quality of an image sensor, comprising:
generating, by an image learning data generation unit, an image tuning knowledge database, which includes pairs of a plurality of sets of values of a plurality of parameters and a plurality of sets of image quality evaluation scores for a plurality of image quality evaluation items for evaluating a quality of each of a plurality of images generated by the image sensor;
generating, by an image signal processor modeling unit, a machine learning model, for each image sensor, for automatically optimizing the quality of each image;
optimizing, by an image sensor image quality optimization unit, the image quality of the image sensor by automatically controlling values of one or more of the plurality of parameters based on a user's image quality selection and the machine learning model; and
verifying, by a distributed camera simulation system, a result of optimizing the image quality of the image sensor,
wherein the image tuning knowledge database is generated by specifying a range of values of each of associated parameters that affect producing a high image quality evaluation score, and randomly sampling parameter values from the specified range of parameter values.

14. The method of claim 13, wherein
the distributed camera simulation system includes two or more servers,
each of the two or more servers includes an image signal processor simulator and an image quality evaluation automatic labeling module,
the image signal processor simulator receives a plurality of parameter values and a raw image, which is obtained by capturing an image of a subject using the image sensor, and
the image quality evaluation automatic labeling module outputs a plurality of image quality evaluation scores corresponding to the plurality of parameter values received by the image signal processor simulator.

15. The method of claim 14, wherein optimizing the image quality of the image sensor comprises:

generating an image tuning configuration by controlling values of one or more parameters among the plurality of parameters based on the user's image quality selection and the machine learning model.

16. The method of claim 15, wherein verifying the result of optimizing the image quality of the image sensor comprises:
inputting a result of reflecting the image tuning configuration in the raw image to the image signal processor simulator;
providing a result image output through the image signal processor simulator; and
storing the image tuning configuration and the result image in a user tuning history database.

17. A platform for automatic optimization of an image quality of an image sensor, comprising:
a distributed camera simulation system that receives a raw image, which is obtained by capturing an image of a subject using the image sensor, and a plurality of parameter values, and outputs a plurality of image quality evaluation scores for a plurality of image quality evaluation items for evaluating the quality of each of a plurality of images generated by the image sensor;
an image learning data generation unit that generates an image tuning knowledge database, which includes pairs of a plurality of sets of values of a plurality of parameters and the plurality of sets of image quality evaluation scores;
an image signal processor modeling unit that generates a machine learning model, for each image sensor, for automatically optimizing the quality of each image;
an image sensor image quality optimization unit that generates an image tuning configuration by automatically controlling values of one or more of the plurality of parameters based on a user's image quality selection and the machine learning model;
a database storage that stores a raw image database, which includes a set of raw images; and
a user server provided via an Internet or an application server,
wherein
the distributed camera simulation system includes a plurality of servers,
each of the servers includes an image signal processor simulator and an image quality evaluation automatic labeling module, and
the machine learning model is implemented as an artificial neural network having values of the plurality of parameters as an input layer and the plurality of image quality evaluation scores as an output layer.

18. The platform of claim 17, wherein the image of the subject includes a chart image including different geometric figures and a natural scene.

19. The platform of claim 17, wherein the database storage further stores a virtual model database for each image sensor, which includes a set of machine learning models for each image sensor.

20. The platform of claim 17, wherein the database storage further stores a user tuning history database, which includes the image tuning configuration generated by the image sensor image quality optimization unit.

* * * * *